United States Patent [19]

Mazond et al.

[11] 4,323,749
[45] Apr. 6, 1982

[54] PROCESS AND APPARATUS FOR MACHINING BY ELECTRICAL DISCHARGES ALONG A SLANT AXIS

[75] Inventors: Michel P. Mazond, Annemasse, France; Alain Wavre, Geneva, Switzerland

[73] Assignee: Ateliers des Charmilles, S.A., Geneva, Switzerland

[21] Appl. No.: 189,798

[22] Filed: Sep. 22, 1980

[30] Foreign Application Priority Data

Oct. 9, 1980 [CH] Switzerland .................... 9053/79

[51] Int. Cl.$^3$ .............................................. B23P 1/12
[52] U.S. Cl. ................................ 219/69 M; 219/69 V
[58] Field of Search ........................... 219/69 M, 69 V

[56] References Cited

U.S. PATENT DOCUMENTS 4,135,070 1/1979 Pfau et al. ....................... 219/69 V
4,150,275 4/1979 Wavre ............................. 219/69 V Primary Examiner—C. C. Shaw
Attorney, Agent, or Firm—Hauke and Patalidis

[57] ABSTRACT

The present invention is a process and apparatus for machining an electrode workpiece by electrical discharges, wherein the electrode workpiece and an electrode tool are displaced relative to each other at least in one slant direction disposed at a predetermined angle with the principal axis of feed of one electrode relative to the other, the machining gap between the electrodes is set at a finite value such as to maintain predetermined machining conditions, consecutive machining passes are effected and, at the end of each machining pass, the slant direction of feed is displaced as soon as the amplitude of relative displacement between the electrodes reaches a predetermined limit value, and such limit value is changed from one pass to the next. For the purpose of removing material from the workpiece to an equal depth on all the surfaces of the workpiece in the course of a finish machining pass, the electrodes are displaced relative to each other in slanted directions which are modified as soon as the amplitude of displacement reaches a predetermined limit value whose envelope is a hemisphere. As a result of effecting such consecutive relative displacements of the electrodes in a specific predetermined sequence while maintaining the density of the machining current at an optimum value, the total duration of the finish machining operation is considerably reduced as compared to the prior art.

8 Claims, 5 Drawing Figures

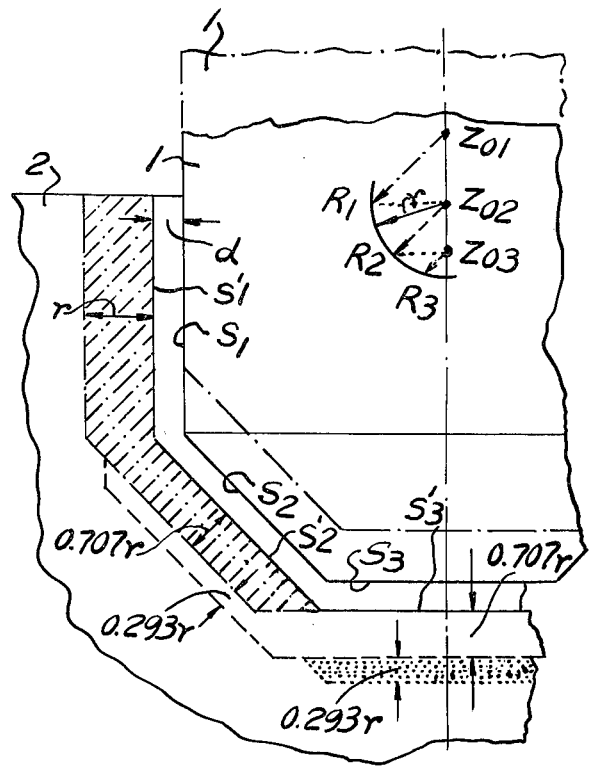
FIG.1
PRIOR ART
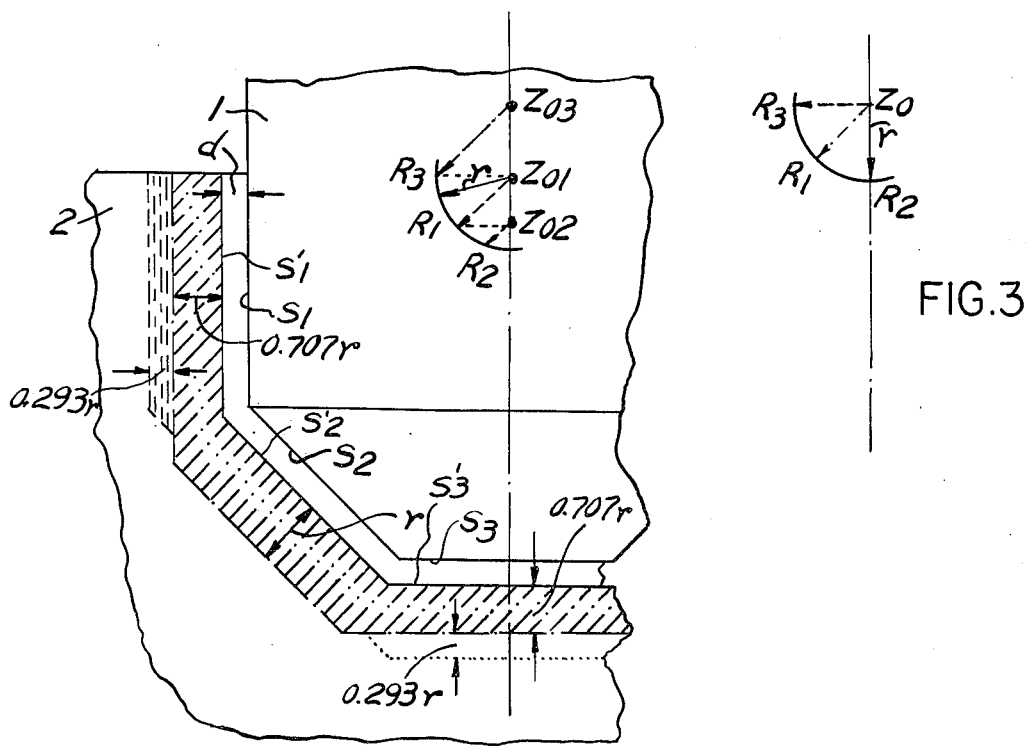
FIG.2
FIG.3

PROCESS AND APPARATUS FOR MACHINING BY ELECTRICAL DISCHARGES ALONG A SLANT AXIS

BACKGROUND OF THE INVENTION

The present invention relates to an EDM process and apparatus wherein the electrodes, electrode workpiece and electrode tool, are displaced relative to each other during machining by electrical discharges, in a slant direction, or a direction at an angle to the principal axis of feed of one electrode relative to the other.

In U.S. Pat. No. 4,135,070, assigned to the same assignee as the present application, there is disclosed a process and apparatus presenting the advantage of machining simultaneously a lateral surface and a frontal surface of an electrode workpiece, as a result of providing a slanted feed of one electrode relative to the other, and providing simultaneous withdrawal of the electrode tool from proximate the machined surfaces in the event of a short circuit, for example.

Such an arrangement permits to obtain a uniform multi-directional quasi-enlargement of the electrode tool, if the position limits of the displacement in every direction of one electrode relative to the other have a hemispherical envelope. As disclosed in said patent, the relative displacements in the slant directions are effected successively in the same direction along the principal axis of relative feed of the electrodes.

The principal object of the invention is to improve upon the method disclosed in the aforementioned patent, while preserving all of its advantages. The present invention contemplates that the slant direction of electrode relative feed in the course of a first machining pass is arbitrarily chosen such as to produce electrical discharges machining alternatively of the lateral surfaces and of the frontal surfaces of the workpiece, and for a variation of the slant direction in the course of subsequent machining passes such as to machine consecutively the lateral and frontal surfaces of the workpiece, and further provides for the speed of feed of the electrode tool into the workpiece to be maintained within predetermined limits in the course of each of the machining passes.

When the speed of feed does not vary as a function of the surface being machined, the mentioned sequence of machining passes permits to obtain a substantial reduction of the duration of a machining operation.

The various objects and advantages of the present invention will become apparent to those skilled in the art from the following description of the best mode contemplated for practicing the invention, when read in conjunction with the accompanying drawing showing, for illustrative purposes only, two examples of structure for practicing the invention, and in which:

BRIEF DESCRIPTION OF THE DRAWING

FIG. 1 is a schematic diagram illustrating the rate of material removal from a workpiece, utilizing the process of the prior art;

FIG. 2 is a schematic diagram similar to FIG. 1, but showing the rate of material removal according to the present invention;

FIG. 3 is a portion of the diagram of FIG. 2, showing a modification of the invention;

DETAILED DESCRIPTION OF THE PREFERRED EMBODIMENTS

Figure 4:
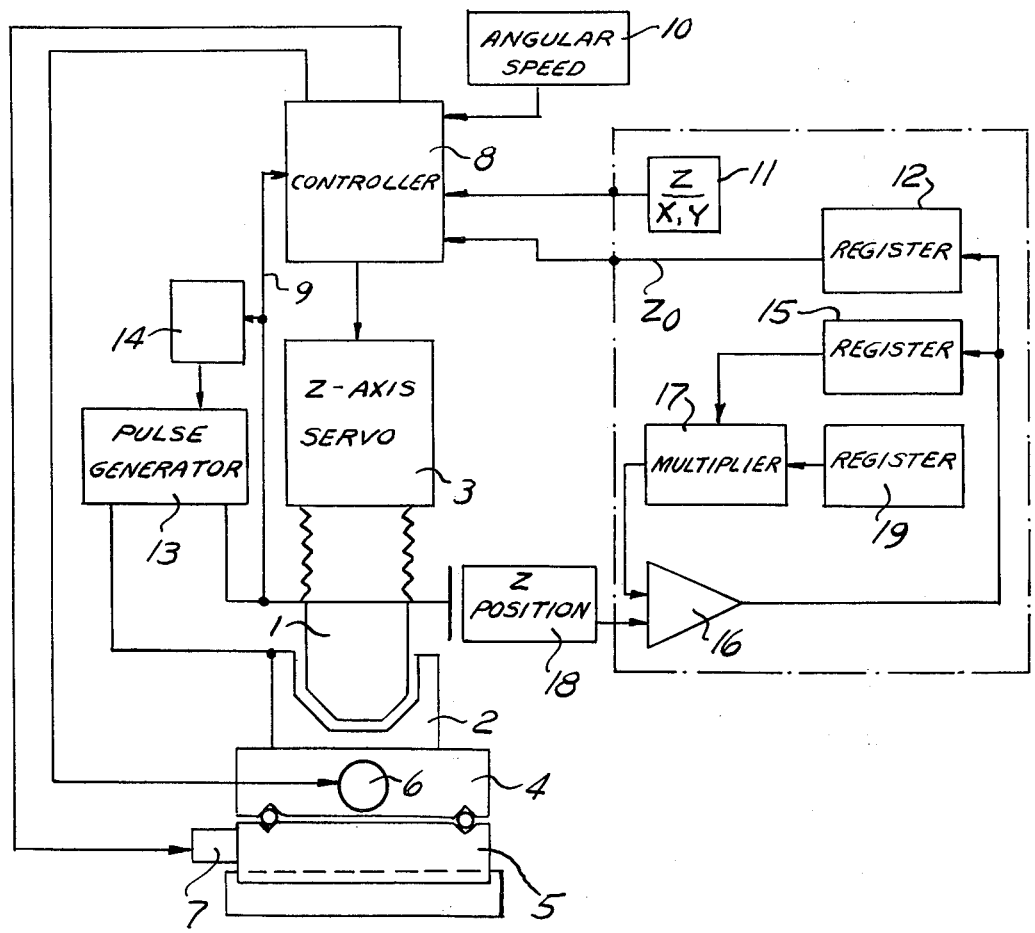
FIG. 4 represents an example of apparatus for practicing the process of the invention diagrammatically represented at FIG. 2.

Referring to the drawing, and more particularly to FIG. 1, there is illustrated in a schematic manner a partial section, without cross-hatching, through the electrode tool 1 of an EDM apparatus and an electrode workpiece 2 separated by a "sparking" or electrical discharge gap d. The electrode tool 1 has a lateral surface $S_1$, a slanted surface $S_2$ and a frontal surface $S_3$.

According to the method disclosed in the aforementioned patent, a finish machining operation can be achieved in three consecutive machining passes, a first pass during which the electrode tool 1 is displaced relative to the electrode workpiece 2 in the direction and of the distance represented by the vector $Z_{01}R_1$ relative to the electrode workpiece 2, followed by a second machining pass during which the direction and distance of displacement is according to $Z_{02}R_2$, followed in turn by a third machining pass during which the direction and distance of displacement is according to $Z_{03}R_3$. The final positions $R_1$, $R_2$, and $R_3$ are on a hemispherical envelope having a radius r and whose center is at the initial position $Z_{02}$.

During the first machining pass corresponding to $Z_{01}R_1$, material removal to a depth r is effected by the lateral surface $S_1$ of the electrode tool 1 on the lateral surface $S'_1$ of the electrode workpiece 2 while simultaneously being effected on the slanted surface $S'_2$ of the workpiece by the electrode tool slanted surface $S'_2$, which is slanted at 45°, to a depth of 0.707r. No material removal is effected on the frontal surface of the workpiece $S'_3$ corresponding to the frontal surface $S_3$ of the electrode tool, because the electrode tool is not displaced axially beyond its initial position $Z_{02}$, the initial position of the electrode tool 1 being shown in phantom line prior to displacement in the direction and to the distance $Z_{01}R_1$. The electrode tool is subsequently retracted laterally, so that it occupies the position shown in full line at FIG. 1.

During the second machining pass according to vector $Z_{02}R_2$, machining is effected first on the workpiece frontal surface $S'_3$ corresponding to the electrode tool frontal surface $S_3$ to a depth of 0.5r, and, subsequently, simultaneously on the workpiece slanted surface $S'_2$ corresponding to the slanted surface $S_2$ of the electrode tool to a depth of 0.293r and on the frontal surface $S'_3$ of the workpiece corresponding to the frontal surface $S_3$ of the electrode tool to an additional depth of 0.207r, giving a total depth of machining of the frontal surface $S'_3$ of the workpiece equal to 0.707r.

In the course of a third machining pass according to vector $Z_{03}R_3$, the frontal surface $S'_3$ of the workpiece corresponding to the frontal surface $S_3$ of the electrode tool is machined to an additional depth of 0.293r. By using an adaptive regulation of the machining current which maintains the current density of the electrical discharge or, alternatively, the speed of feed of the electrode tool relative to the electrode workpiece at a value substantially constant, for instance by varying the duration of the cut-off time intervals between consecutive pulse trains, for example according to the system disclosed in U.S. Pat. No. 3,875,362 assigned to the same assignee as the present invention, the thickness of the material removed from all the surfaces of the workpiece is proportional to the total duration of the machining process.

In the example of operation illustrated at FIG. 1, the duration of the first machining phase or pass is equal to one unit of time, the duration of the second machining pass or phase is equal to (0.5+0.207) unit of time or 0.707 unit of time, and that of the third pass or phase is equal to 0.293 unit of time, such that the total duration of the machining operation during which material is removed to a depth r from the surfaces $S'_1$, $S'_2$ and $S'_3$ of the workpiece corresponding to the surfaces SHd 1, $S_2$ and $S_3$ of the electrode tool is equal to 2 units of time.

FIG. 2 illustrates, in the form of a diagram, the particular sequences of machining passes or phases according to the invention for removing material from a workpiece. The first machining phase or pass is effected from the original position $Z_{01}$ in the direction and to the distance represented by vector $Z_{01}R_1$ such as to remove material to a depth r from the workpiece slanted surface $S'_2$ corresponding to the electrode tool slanted surface $S_2$, to a depth 0.707r material on the lateral surface $S'_1$ of the workpiece corresponding to the electrode tool lateral surface $S_1$, and to an identical depth 0.707r material from the frontal surface $S'_3$ of the workpiece. Material is subsequently removed to a depth of 0.293r from the frontal surface $S'_3$ of the workpiece corresponding to the frontal surface $S_3$ of the electrode tool in the course of a second machining pass or phase effected according to $Z_{02}R_2$. Material is subsequently removed to an equal depth 0.293r from the lateral surface $S'_1$ of the workpiece corresponding to the lateral surface $S_1$ of the electrode tool, in the course of a third machining pass or phase executed in the direction and to the distance $Z_{03}R_3$.

The duration of the first machining pass has a duration of one unit of time, but the two subsequent machining passes have each a duration corresponding to 0.293 unit of time, such that the total duration of the machining operation resulting in removing material from the three surfaces of the workpiece to a depth r is equal only to 1.596 units of time. The time saving obtained by the new process of the invention, as compared to the prior art, results in an increase of 20% in machining efficiency, as is evident from a comparison between FIG. 1 and FIG. 2.

It is to be appreciated that the order in which the second and third passes are effected has absolutely no effect on the total machining time.

The same result could be achieved by changing the slant of the direction of motion during the second and third machining passes, for example as shown at FIG. 3, as a result of effecting from an initial position $Z_0$ a vertical motion according to vector $Z_0R_2$, followed by a horizontal motion according to vector $Z_0R_3$.

The relative motion between the electrodes during the first machining pass is not necessarily executed at an angle of 45°, but at an angle permitting to remove preferably as much material from the lateral surface as from the frontal surface of the workpiece. The following passes can be effected at other angles and in as many times as necessary, but always by displacing successively the machining on the lateral surfaces and on the frontal surfaces of the workpiece.

An example of automatic control for practicing the new EDM machining method of the invention is illustrated at FIG. 4.

As shown at FIG. 4, an EDM apparatus is illustrated as comprising an electrode tool 1 displaced vertically, along the Z-axis by a servo-motor 3, the electrode workpiece 2 being mounted on a table provided with cross-slides 4 and 5 actuated respectively by servo-motors 6 and 7, such as to displace the workpiece along the X- and Y-axes. The three servo-motors 3, 6 and 7 are controlled by a controller 8, such as to displace the electrodes relative to each other according to the amplitudes of displacements and the directions illustrated at FIGS. 1-3.

The controller 8 may consist of analog or digital circuits or, for example, it may be made according to the circuit disclosed in U.S. Pat. No. 4,150,275. The controller 8 accepts at its inputs data corresponding to four machining parameters. The first parameter is the machining voltage, supplied through a line 9, which is used for controlling the speed of feed. The second parameter is the angular speed of relative motion between the electrodes which is supplied from a circuit 10. The third parameter is the ratio between the axial displacement of the electrode tool 1 relative to the electrode workpiece 2 and the transverse displacement of the workpiece 2, the ratio between the two being supplied from a circuit 11. The fourth parameter represents the axial position of the electrode tool at which starts the transverse displacement of the electrode workpiece, such a position being modified by a transfer register 12 which determines the sequence of displacements in the slant direction.

Electrical discharges are supplied by a pulse generator 13 connected across the electrodes 1 and 2 and controlled by a control circuit 14. The control circuit 14, which accepts at its input a signal representing the machining voltage, establishes an automatic adaptive adjustment of the time intervals between two consecutive voltage pulses provided by the pulse generator 13 in response to the machining conditions, according to a system forming no part of the present invention, and such as, for example disclosed in U.S. Pat. No. 3,875,362. Such an arrangement permits to maintain a substantially constant feed speed in the course of each of the machining passes.

The amplitude limit value of the translation motion is supplied by a second transfer register 15 whose operation is synchronized with the operation of the register 12. The output of the transfer register 15 is connected to one of the inputs of a comparator 16 through a multiplier circuit 17, the other input of the comparator 16 being connected to the output of a position detector transducer 18 providing a signal representative of the instantaneous real position of the electrode tool 1. The output of the comparator 16 is connected to the inputs of both the transfer registers 12 and 15. The multiplicand applied to the multiplier 17 is obtained from a third register 19.

When the amplitude limit value determined by the register 15 and the multiplier 17 equals the position supplied by the position transducer 18, a pulse is supplied at the output of the comparator 16 to the input of the register 12 for causing a displacement of the translation motion parallelly to itself. The same pulse is applied to the register 15 for changing the amplitude limit value of the translation, all the limit values being chosen such as to describe a hemispherical envelope having its center at the position $Z_{01}$ of FIG. 2. After a complete sequence of direction changes, the register 19 changes all the limit values in the same ratio such that the limit values are situated, in the course of the following machining pass, on another hemisphere concentric to the first one.

Figure 5:
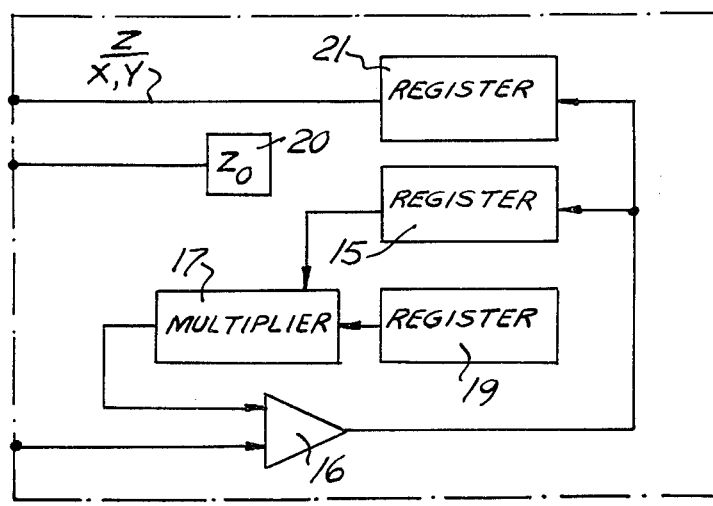
FIG. 5 is an example of a control circuit for practicing the modification of the invention diagrammatically represented at FIG. 3.

FIG. 5 illustrates a modification of the control circuit of FIG. 4 for effecting the electrode displacements corresponding to the diagram of FIG. 3 in which all the displacements start from an initial position $Z_0$. A reference circuit 20 determines the initial position $Z_0$ and a register 21 varies the slant of the electrode displacements from such initial position after each machining pass, the maximum amplitudes of the machining passes being set by means of the same elements as shown at FIG. 4.

Having thus described the present invention, modifications whereof will be apparent to those skilled in the art, what is claimed as new is as follows:

1. A process for electrical discharge machining of an electrode workpiece by an electrode tool wherein said electrodes are displaced one relative to the other at least in one slant direction at a predetermined angle with the principal axis of feed motion of one electrode relative to the other, said process comprising setting the machining gap between said electrodes such as to maintain predetermined machining conditions, effecting consecutive machining passes in slant directions, displacing each of said slant directions as soon as the amplitude of said displacement reaches a predetermined value, and varying said limit value from one machining pass to the other, wherein the first of said slant directions is chosen in the course of the first machining pass such that machining is effected simultaneously on lateral and frontal surfaces of said electrode workpiece and each of said slanted directions is displaced in the course of subsequent machining passes such as to provide machining alternatively on lateral and on frontal surfaces of said electrode workpiece, and maintaining the speed of feed of said electrode tool into said electrode workpiece within predetermined limits in the course of each of said machining passes.

2. The process of claim 1 wherein said initial slant direction is displaced parallel to said initial direction in the direction of said principal axis at least once in one direction and once in an opposite direction.

3. The process of claim 1 wherein the angle of said slant direction with said principal axis is increased at least once and decreased at least once relative to said initial direction of said first machining pass.

4. The process of claim 2 wherein the angle of said slant direction with said principal axis is increased at least once and decreased at least once relative to said initial direction of said first machining pass.

5. An apparatus for machining by electrical discharges an electrode workpiece by means of an electrode tool wherein the electrodes are displaced relative to each other at least in one slant direction forming a predetermined angle with the principal axis of feed of one electrode into the other, said apparatus comprising a servo mechanism for displacing said electrodes one relative to the other according to a longitudinal motion and to a transverse motion while maintaining a predetermined ratio parameter between longitudinal displacement and transverse displacement from an axial predetermined reference position parameter, adjusting means for controlling said motions such as to maintain predetermined machining conditions, a first transfer register for varying at least one of said ratios and of said axial position parameter such that said machining is effected simultaneously on frontal and lateral surfaces of said electrode workpiece in the course of a first machining pass and alternatively on each of said surfaces in the course of subsequent consecutive machining passes, means for detecting the axial position of said electrode tool relative to said electrode workpiece, comparator means for controlling said first register in response to the difference between a detected axial position and a reference position, a second register cooperating with said first register for varying said reference position such as to maintain said reference position on a hemispherical envelope, and adjusting means for modifying the average value of machining current in response to machining conditions such as to maintain the speed of penetration of the electrode tool into the electrode workpiece within predetermined values.

6. The apparatus of claim 5 wherein said parameter varied by said first register is said ratio.

7. The apparatus of claim 5 wherein said parameter varied by said first register is said axial reference position.

8. The apparatus of claim 5 wherein said parameters varied by said first register is both said ratio and said axial reference position.

* * * * *